(12) United States Patent
Tsuchiya et al.

(10) Patent No.: US 9,331,351 B2
(45) Date of Patent: *May 3, 2016

(54) SOLID OXIDE FUEL CELL DEVICE

(75) Inventors: Katsuhisa Tsuchiya, Kitakyushu (JP);
Toshiharu Otsuka, Kitakyushu (JP);
Tsukasa Shigezumi, Kitakyushu (JP);
Toshiharu Ooe, Kitakyushu (JP);
Kiyotaka Nakano, Kitakyushu (JP);
Yoshiyuki Kawamura, Kitakyushu (JP)

(73) Assignee: TOTO LTD., Fukuoka (JP)

( * ) Notice: Subject to any disclaimer, the term of this patent is extended or adjusted under 35 U.S.C. 154(b) by 715 days.

This patent is subject to a terminal disclaimer.

(21) Appl. No.: 12/788,878

(22) Filed: May 27, 2010

(65) Prior Publication Data

US 2010/0304249 A1    Dec. 2, 2010

(30) Foreign Application Priority Data

May 28, 2009  (JP) .................................. 2009-129051
May 19, 2010  (JP) .................................. 2010-114968

(51) Int. Cl.
*H01M 8/04* (2006.01)
*H01M 8/06* (2016.01)
(Continued)

(52) U.S. Cl.
CPC .............. *H01M 8/0618* (2013.01); *C01B 3/38* (2013.01); *H01M 8/04223* (2013.01);
(Continued)

(58) Field of Classification Search
CPC ............ H01M 8/618; H01M 8/04776; H01M 8/04268; H01M 8/04022; H01M 8/04223; H01M 8/04373; H01M 8/04425; H01M 8/04738; H01M 8/0618; H01M 2008/1293; C01B 3/382; C01B 2203/066; C01B 2203/085; C01B 2203/1288; C01B 2203/1604; C01B 2203/1619; Y02E 60/525

USPC ......... 429/408, 414–414, 423, 425, 428–429, 429/433–436, 443–444, 446, 452, 545, 456, 429/465, 479–483, 490, 492–495, 512–513, 429/515, 535
See application file for complete search history.

(56) References Cited

U.S. PATENT DOCUMENTS

2004/0038095 A1*  2/2004  Kushibiki et al. ............... 429/20
2004/0219399 A1*  11/2004  Zhu et al. ........................ 429/13
(Continued)

FOREIGN PATENT DOCUMENTS

CA    2689674 A1    12/2008
CA    2697652 A1     3/2009
(Continued)

OTHER PUBLICATIONS

Extended European Search Report for European Application No. 10164040.7, dated Sep. 30, 2010, 6 pages.
(Continued)

*Primary Examiner* — Gary Harris
(74) *Attorney, Agent, or Firm* — Brinks Gilson & Lione

(57) ABSTRACT

To provide a solid oxide fuel cell device capable of smooth transition from a startup state to an electrical generating state. The present invention is a solid oxide fuel cell device (1) for generating electricity, having a fuel cell module (2); a reformer (20), a fuel supply device (38); a water supply device (28), a generating oxidant gas supply device (45), and a controller (110) for controlling the fuel supply device and water supply device at the time of startup when the fuel cell module solid oxide fuel cell unit is raised to a temperature at which electrical generation is possible; whereby the controller controls the fuel supply device during the SR operation such that electrical generation is started after reducing the fuel supply flow rate prior to starting electrical generation.

6 Claims, 13 Drawing Sheets

(51) Int. Cl.
*C01B 3/38* (2006.01)
*H01M 8/24* (2016.01)
*H01M 8/12* (2016.01)

(52) U.S. Cl.
CPC .... *H01M 8/0625* (2013.01); *C01B 2203/0244* (2013.01); *C01B 2203/066* (2013.01); *C01B 2203/1058* (2013.01); *C01B 2203/1064* (2013.01); *C01B 2203/1258* (2013.01); *C01B 2203/1276* (2013.01); *C01B 2203/169* (2013.01); *C01B 2203/1609* (2013.01); *C01B 2203/1619* (2013.01); *C01B 2203/1685* (2013.01); *H01M 8/04022* (2013.01); *H01M 8/0432* (2013.01); *H01M 8/04268* (2013.01); *H01M 8/04776* (2013.01); *H01M 8/243* (2013.01); *H01M 2008/1293* (2013.01); *Y02E 60/50* (2013.01); *Y02E 60/525* (2013.01)

(56) References Cited

U.S. PATENT DOCUMENTS

| | | | |
|---|---|---|---|
| 2008/0102331 A1* | 5/2008 | Takada | 429/20 |
| 2010/0119894 A1* | 5/2010 | Ishida | 429/17 |
| 2010/0221619 A1 | 9/2010 | Fujihara et al. | |
| 2010/0304235 A1 | 12/2010 | Shigezumi et al. | |
| 2010/0304241 A1 | 12/2010 | Ooe et al. | |
| 2010/0304242 A1 | 12/2010 | Tsuchiya et al. | |
| 2010/0304243 A1 | 12/2010 | Tsuchiya et al. | |
| 2010/0304244 A1 | 12/2010 | Tsuchiya et al. | |
| 2010/0304245 A1 | 12/2010 | Tsuchiya et al. | |
| 2010/0304246 A1 | 12/2010 | Watanabe et al. | |
| 2011/0053017 A1* | 3/2011 | Takahashi | 429/423 |
| 2012/0015262 A1 | 1/2012 | Watanabe et al. | |
| 2012/0021307 A1 | 1/2012 | Watanabe et al. | |
| 2012/0021319 A1 | 1/2012 | Tsuchiya et al. | |
| 2012/0028143 A1 | 2/2012 | Akagi et al. | |

FOREIGN PATENT DOCUMENTS

| | | |
|---|---|---|
| EP | 2256847 A1 | 12/2010 |
| EP | 2256848 A1 | 12/2010 |
| EP | 2256849 A1 | 12/2010 |
| EP | 2256850 A1 | 12/2010 |
| EP | 2256851 A1 | 12/2010 |
| EP | 2264822 A1 | 12/2010 |
| EP | 2312679 A1 | 4/2011 |
| EP | 2416418 A1 | 2/2012 |
| EP | 2416419 A1 | 2/2012 |
| EP | 2416420 A1 | 2/2012 |
| EP | 2416421 A1 | 2/2012 |
| JP | 2006-318714 A | 11/2006 |
| JP | 2007-103194 A | 4/2007 |
| JP | 2009-032555 A | 2/2009 |
| WO | WO 2007/091632 A1 | 8/2007 |
| WO | WO 2008099893 A1 * | 8/2008 |
| WO | WO 2009/028427 A1 | 3/2009 |
| WO | WO 2009028427 A1 * | 3/2009 |

OTHER PUBLICATIONS

Examination Report from counterpart EP Application No. 10164040.7, dated Feb. 13, 2013, 6 pages.

\* cited by examiner

FIG.12

| REQUIRED AMOUNT OF ELECTRICITY | FUEL SUPPLY FLOW RATE L/min | GENERATING AIR SUPPLY FLOW RATE L/min | WATER FLOW RATE cc/min |
|---|---|---|---|
| 700W | 2.8 | 48 | 5.9 |
| 450W | 2.2 | 33 | 5.4 |
| 200W | 1.7 | 25 | 3.9 |

FIG.13

| MODE | STATE | FUEL SUPPLY FLOW RATE (L/min) | REFORMING AIR SUPPLY FLOW RATE (L/min) | POWER GENERATING AIR SUPPLY FLOW RATE (L/min) | WATER SUPPLY FLOW RATE (cc/min) | TEMPERATURE CONDITIONS FOR TRANSITION(°C) | | |
|---|---|---|---|---|---|---|---|---|
| | | | | | | REFORMER | STACK | EVAPORATING SECTION |
| STARTUP MODE | COMBUSTION OPERATION | 6.0 | 10.0 | 100.0 | 0.0 | 300°C OR ABOVE | – | – |
| | POX1 | 6.0 | 10.0 | 100.0 | 0.0 | 350°C OR ABOVE | – | – |
| | POX2 | 5.0 | 18.0 | 100.0 | 0.0 | 600°C OR ABOVE | 250°C OR ABOVE | – |
| | ATR1 | 5.0 | 8.0 | 100.0 | 2.0 | 600°C OR ABOVE | 400°C OR ABOVE | 100°C OR ABOVE |
| | ATR2 | 4.0 | 4.0 | 100.0 | 3.0 | 650°C OR ABOVE | 600°C OR ABOVE | 100°C OR ABOVE |
| | SR1 | 3.0 | 0.0 | 100.0 | 8.0 | 650°C OR ABOVE | 700°C OR ABOVE | 100°C OR ABOVE |
| | SR2 | 2.3 | 0.0 | 80.0 | 6.3 | 650°C OR ABOVE | 700°C OR ABOVE | 100°C OR ABOVE |

SOLID OXIDE FUEL CELL DEVICE

RELATED APPLICATIONS

This application claims priority under 35 U.S.C. §119 to Japanese Patent Application Nos. 2009-129051 filed on May 28, 2009, and 2010-114968 filed on May 19, 2010, the entire contents of which are hereby incorporated by reference.

BACKGROUND OF THE INVENTION

1. Field of the Invention

The present invention relates to a solid oxide fuel cell device, and more particularly to a solid oxide fuel cell device for generating electricity by reacting fuel with a generating oxidant gas.

2. Description of the Related Art

Solid oxide fuel cells ("SOFCs" below) operate at relatively high temperatures, using an oxide ion-conducting solid electrolyte as an electrolyte, with electrodes placed on each side thereof, and with fuel gas supplied to one side thereof and oxidant (air, oxygen, or the like) supplied to the other side thereof.

In such SOFCs, steam or carbon dioxide is produced by the reaction between oxygen ions passed through the oxide ion-conducting solid electrolyte and fuel, thereby generating electrical and thermal energy. The electrical energy is removed to outside the SOFC, where it is used for various electrical purposes. The thermal energy is transferred to the fuel, the SOFC, the oxidant, and the like, and is used to raise the temperature thereof.

Japanese Patent Unexamined Publication No. 2007-103194 (JP2007-103194A) sets forth a power supply furnished with a solid oxide fuel cell device. In the fuel cell device set forth therein, fuel and air are combusted in a combustion chamber after contributing to the generation of electricity, and that heat of combustion is used to heat a cell stack.

Japanese Patent Unexamined Publication No. 2009-32555 (JP2009-32555A) sets forth a fuel cell device. In this fuel cell device, a fuel gas supplying reformer and fuel cells are raised to a predetermined temperature in a startup stage. In this startup stage, switching off between a partial oxidation reforming process (POX), an auto-thermal process (ATR), and a steam reforming process (SR) occurs as the temperature rises within the reformer, thereby reforming the fuel.

Furthermore, in the fuel cell device set forth in JP2009-32555A, control is executed so that electrical generation by the cell stack is begun when the cell stack temperature reaches a temperature at which electrical generation can be started, and electricity is generated while a predetermined flow rate of fuel gas supplied to the reformer and oxygen-containing gas supplied to the cell stack continue to be supplied during an interval between surpassing the temperature at which electrical generation can start and the elapse of a predetermined time. Sufficient electricity is thus obtained when the load-following operation is started following the end of the continuous supply of a predetermined flow rate.

SUMMARY OF THE INVENTION

However, even in solid oxide fuel cell device which perform startup in the way described in JP2009-32555A, the problem occurs that when a load-following operation is begun after generating electricity by continuously supplying a predetermined flow rate of fuel and oxidant gas, operation of the solid fuel cell device becomes unstable. In other words, when transitioning from the startup state to the normal generating state, the fuel cell device operation has a tendency to become unstable. In particular, in the type of fuel cell device wherein the amount of electricity generated is changed in a way which follows the load, for example when the required electrical power is small at the time of the load-following operation startup, the flow rate of fuel supplied suddenly drops when the load-following operation starts. For this reason, the amount of fuel combusted in order to heat the reformer is reduced, and because the steam reforming reaction which occurs inside the reformer is an endothermic reaction, the temperature of the reformer and the cell stack may suddenly drop so that normal electricity generation cannot be carried out. In particular, when the cell stack temperature drops upon the start of electrical generation, a long period of time is required to recover the temperature at which electricity can be generated, creating the problem that normal electrical generation cannot take place over that long period of time.

The present invention therefore has the object of providing a solid oxide fuel cell device capable of smoothly transitioning from the startup state to the electrical generating state.

In order to resolve the above-described problems, the present invention is a solid oxide fuel cell device for generating electricity by reacting fuel and electrical generating oxidant gas, comprising: a fuel cell module furnished with multiple solid oxide fuel cell units; a reformer for supplying reformed fuel to the solid oxide fuel cell units; a fuel supply device for supplying fuel to be reformed by the reformer, a water supply device for supplying water to the reformer; an electrical generating oxidant gas supply device for supplying oxidant gas for electrical generation to the solid oxide fuel cell units; and a controller for controlling the fuel supply device and the water supply device during startup procedure wherein the solid oxide fuel cell units in the fuel cell module are raised to a temperature at which electricity can be generated, carrying out within the reformer an SR operation, which consists of only a steam reforming reaction, then starting the generation of electricity; whereby the controller controls the fuel supply device so that electrical generation is started after a fixed fuel supply flow rate, reduced to less than the fuel supply flow rate at startup of the SR, is maintained for a predetermined transition time electrical generation to electrical generation.

In the present invention thus constituted, the controller controls the fuel supply device, the water supply device, and the electrical generating oxidant gas supply device, supplying fuel and water to the reformer, and supplying electrical generating oxidant gas to the solid oxide fuel cell unit. Remaining fuel not used to generate electricity in the solid oxide fuel cell unit is combusted and used to heat the reformer. In the startup procedure, when the solid oxide fuel cell unit is raised to a temperature at which electricity can be generated, the control section carries out an SR operation in which only the steam reforming reaction takes place. Here, electrical generation is started after a fixed fuel supply flow rate, reduced to less than the fuel supply flow rate at startup of the SR, is maintained for a predetermined transition time electrical generation.

In the present invention thus constituted, generation of electricity is started after maintaining a fixed fuel supply flow rate for a predetermined transition time to electrical generation or longer, therefore fuel can be stably combusted at the time of electrical generation startup, and the reformer thermal balance can be stabilized. In other words, supplying a quantity of fuel which is less than the fuel supply flow rate at the time of SR startup is a factor in reducing the temperature of the fuel cell module, but because the high-heat capacity fuel cell module reaches a high temperature during SR operation, it is difficult for a significant temperature reduction to occur; rather, when the fuel supply flow rate is reduced, the airflow inside the fuel cell module becomes turbulent, or it becomes difficult to achieve uniformity in the quantity of fuel supplied to each of the multiple solid oxide fuel cell units, leading to temperature inconsistencies in the solid oxide fuel cell units. In the present invention, a fixed fuel supply flow rate is maintained for a predetermined transition time to electrical generation, therefore airflow within the fuel cell module is stable, and the quantity of fuel supplied to each of the cell units is made uniform. This enables the reduction in temperature inconsistencies in the solid oxide fuel cell units and, because an SR is provided wherein the fuel supply flow rate in the SR immediately prior to startup of electrical generation is in a reduced state compared to the fuel supply flow rate at the start up of SR, even if the fuel supply flow rate is reduced at the time of electrical generation startup, a sudden drop in the temperature of the solid oxide fuel cell units can be prevented, and a smooth transition from the startup procedure to the electrical generating state can be achieved.

In the present invention, when the transition time electrical generation has elapsed, if the solid oxide fuel cell units have not reached the temperature at which electricity can be generated, the fixed fuel supply flow rate is maintained until the solid oxide fuel cell units reach a temperature at which electricity can be generated.

In the present invention thus constituted, the controller starts the generation of electricity when the transition time to electrical generation has elapsed and the temperature of the solid oxide fuel cell units has reached a temperature at which electricity can be generated.

In the present invention thus constituted, the startup of electrical generation in a state in which solid oxide fuel cell unit temperature has not risen sufficiently can be prevented, and because a fixed fuel supply flow rate is maintained until the transition time to electrical generation has elapsed, fuel combustion and airflow within the fuel cell module can be stabilized.

In the present invention, the controller preferably maintains the fixed fuel supply flow rate at the SR startup until the solid oxide fuel cell units reach a temperature at which electricity can be generated.

In the present invention thus constituted, the controller reduces the fuel supply flow rate after the temperature of the solid oxide fuel cell units reaches the temperature at which electricity can be generated, following the startup of the SR.

In the present invention thus constituted, the fuel supply flow rate at the time of SR startup is maintained until the temperature at which electricity can be generated is reached, therefore electrical generation can be reliably started after the transition time to electrical generation has elapsed in the reduced fuel supply flow rate state.

In the present invention, the controller preferably maintains the fixed fuel supply flow rate at SR startup until a predetermined initial SR continuation time has elapsed.

In the present invention thus constituted, when a predetermined initial SR continuation time elapses following the startup of the SR, the controller reduces the fuel supply flow rate even if the temperature at which electricity can be generated is not reached. In such cases, the reduced fuel supply flow rate is maintained at least until the solid oxide fuel cell units reach a temperature at which electricity can be generated.

In the present invention thus constituted, if the initial SR time elapses even though the temperature at which electricity can be generated has not been reached, preparations to generate electricity at a reduced fuel supply flow rate are started, and the controller waits until the transition time to electrical generation elapses in the reduced fuel supply flow rate state and the temperature reaches the point at which electricity can be generated, so that following startup, time can be shortened until electrical generation is started.

In the present invention, the transition time to electrical generation is preferably varied in response to predetermined environmental factors.

In the present invention thus constituted, the transition time to electrical generation is changed in response to predetermined environmental factors, therefore the operational state upon startup procedure for starting electrical generation can be sufficiently stabilized even if there is a change in the environment in which the fuel cell device is placed.

In the present invention, the transition time to electrical generation is preferably extended when the outside air temperature is low.

In the present invention thus constituted, the transition time to electrical generation is extended when the outside air temperature is low, therefore fuel combustion can be sufficiently stabilized prior to electrical generation even if the outside air temperature is low and the solid oxide fuel cell unit temperature is slow to rise.

In addition, the present invention is a solid oxide fuel cell device for generating electricity by reacting fuel and electrical generating oxidant gas, comprising a fuel cell module furnished with multiple solid oxide fuel cell units; a reformer for supplying reformed fuel to the solid oxide fuel cell units; fuel supply means for supplying fuel to be reformed by the reformer, water supply means for supplying water to the reformer; electrical generating oxidant gas supply means for supplying oxidant gas for electrical generation to the solid oxide fuel cell units; and control means for controlling the fuel supply means and the water supply means during startup procedure wherein the solid oxide fuel cell units in the fuel cell module are raised to a temperature at which electricity can be generated, carrying out within the reformer SR operation, which consists of only a steam reforming reaction, then starting the generation of electricity; whereby the control means controls the fuel supply means so that electrical generation is started after a fixed fuel supply flow rate, reduced to less than the fuel supply flow rate at startup of the SR, is maintained for a predetermined transition time to electrical generation.

Using the solid oxide fuel cell device of the present invention, a smooth transition can be achieved between the startup state and the electrical generating state.

BRIEF DESCRIPTION OF THE DRAWINGS

FIG. 12: A data table showing an example of the relationship between the required amount of generated electricity and the fuel supply flow rate, generating air supply flow rate, and water supply flow rate needed to produce the required amount of generated electricity.

FIG. 13: An operation table showing an example of a solid oxide fuel cell device startup procedure in an embodiment of the present invention.

DETAILED DESCRIPTION OF THE PREFERRED EMBODIMENTS

Next, referring to the attached drawings, a solid oxide fuel cell (SOFC) device according to an embodiment of the present invention will be explained.

Figure 1:
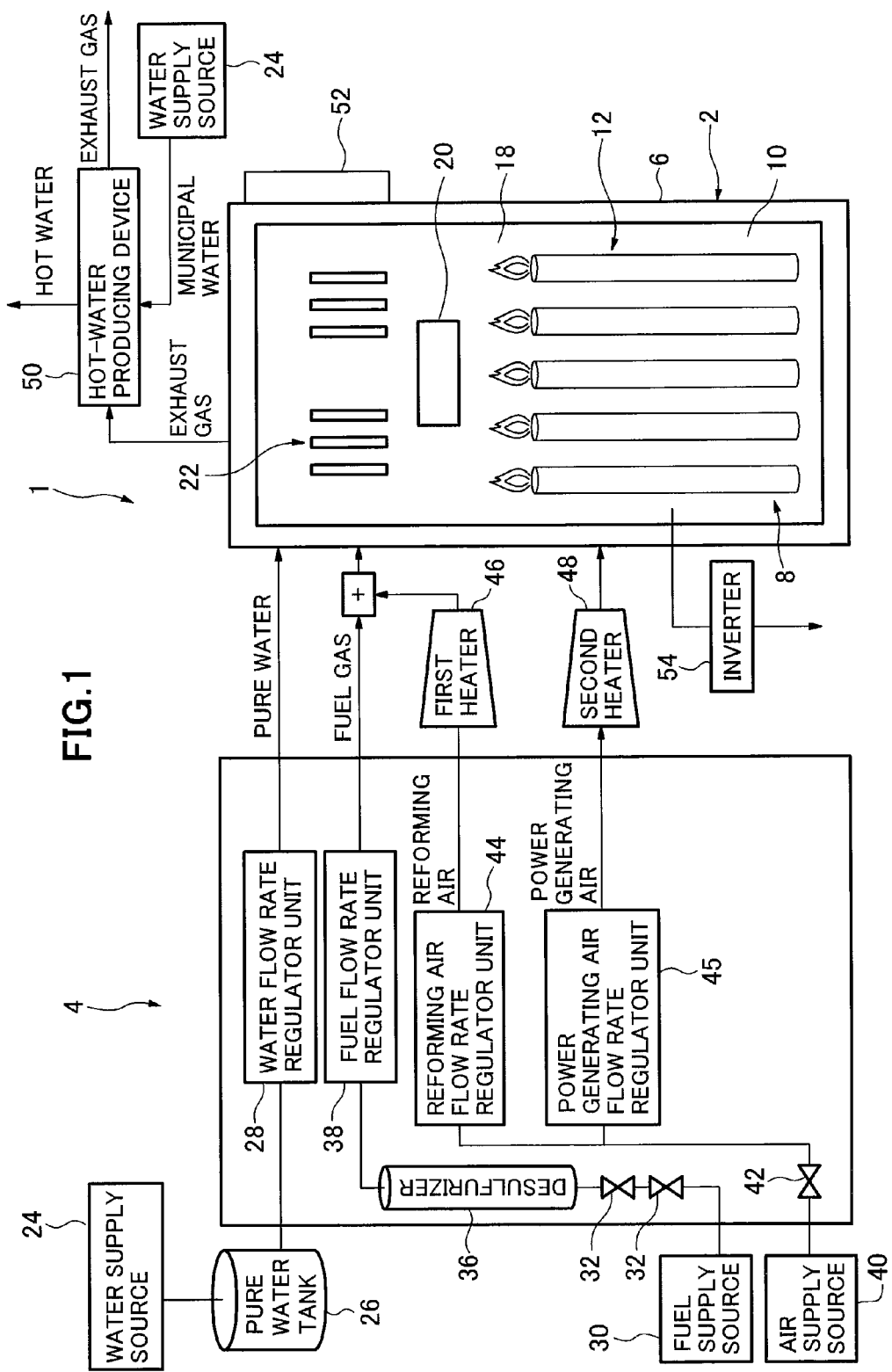
FIG. 1: An overview schematic showing a solid oxide fuel cell device (SOFC) according to an embodiment of the present invention.

As shown in FIG. 1, a solid oxide fuel cell (SOFC) device according to an embodiment of the present invention is furnished with a fuel cell module 2 and an auxiliary unit 4.

The fuel cell module 2 is furnished with a housing 6; a sealed space 8 is formed within the housing 6, mediated by insulating material (not shown, however the insulating material is not an indispensable structure and may be omitted). Note that it is acceptable to provide no insulating material. A fuel cell assembly 12 for carrying out the power generating reaction between fuel gas and oxidant (air) is disposed in the power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the power generation reaction is combusted in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate (liter per minute) of water supplied from the reservoir tank. The auxiliary unit 4 is further furnished with a gas shutoff valve 32 for shutting off the fuel gas supply from a fuel supply source 30 such as municipal gas or the like, a desulfurizer 36 for desulfurizing the fuel gas, and a fuel gas flow rate regulator unit 38 (a "fuel pump" or the like driven by a motor) for regulating the flow rate (liter per minute) of fuel gas. Furthermore, an auxiliary unit 4 is furnished with an electromagnetic valve 42 for shutting off air serving as an oxidant and supplied from an air supply source 40, and a reforming air flow rate regulator unit 44 and generating air flow rate regulator unit 45 ("air blower" or the like driven by a motor) for regulating air flow rate (liter per minute).

Note that in the SOFC device according to the embodiment of the present invention, there is no heating means such as a heater for heating the reforming air supply to the reformer 20 or the power generating air supply to the power generating chamber 10 in order to efficiently raise the temperature at startup, nor is there a heating means for separately heating the reformer 20.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside is connected to the fuel cell module 2.

Figure 2:
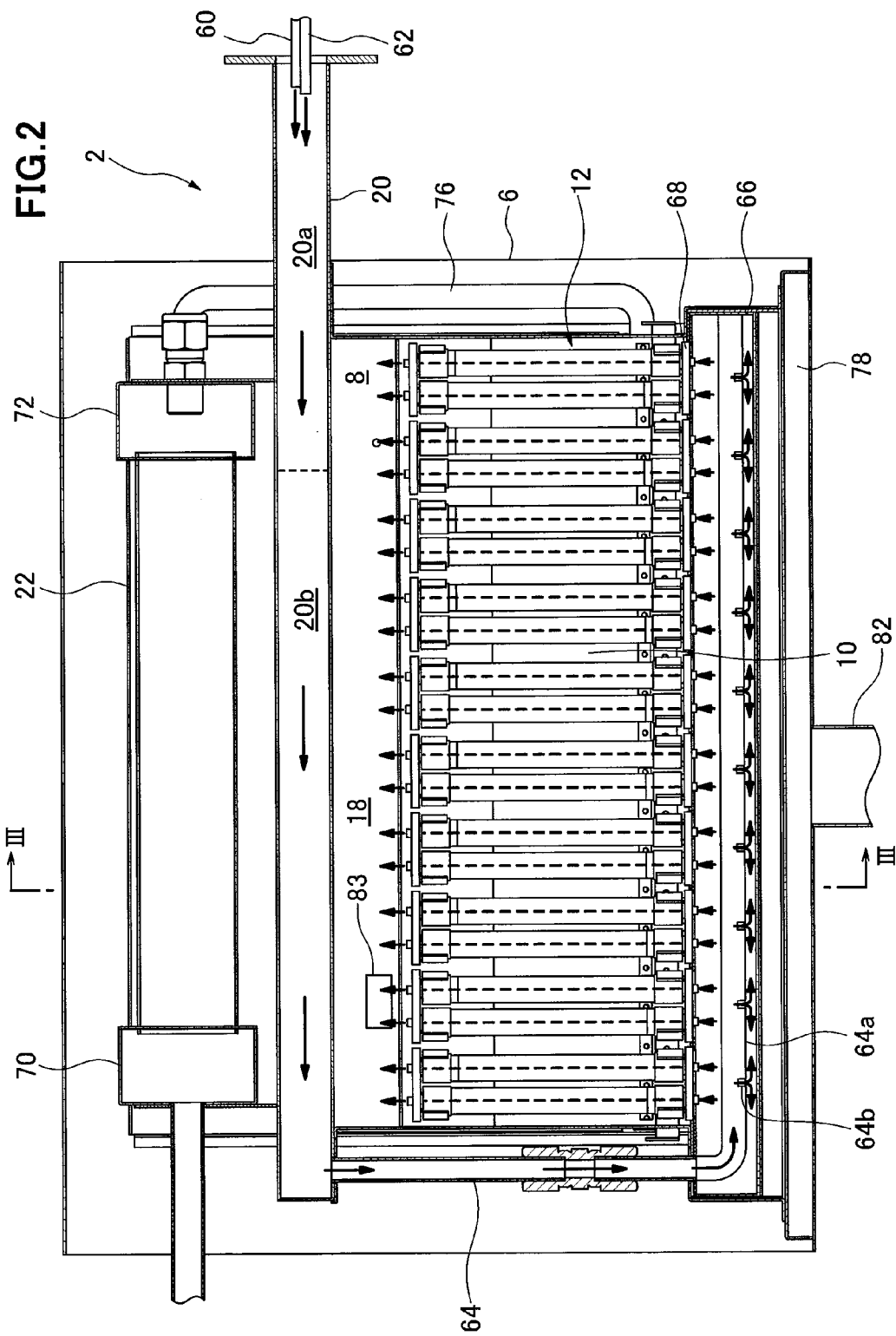
FIG. 2: A front elevation sectional diagram showing a solid oxide fuel cell device (SOFC) fuel cell module according to an embodiment of the present invention.
Figure 3:
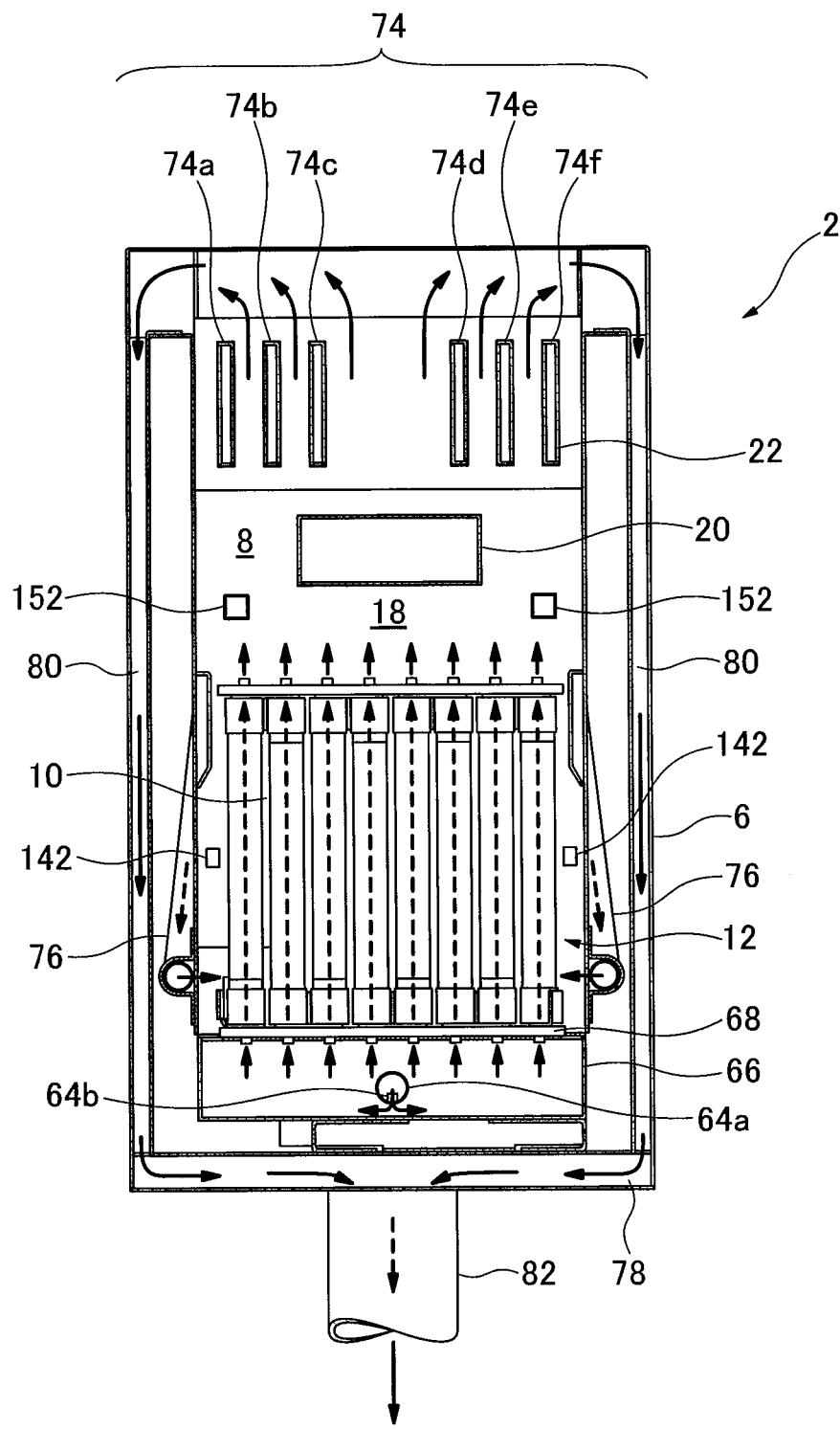
FIG. 3: A sectional diagram along line III-III in FIG. 2.

The internal structure of the solid oxide fuel cell (SOFC) device according to the embodiment of the present invention is explained using FIGS. 2 and 3.

As shown in FIGS. 2 and 3, a fuel cell assembly 12, a reformer 20, and an air heat exchanger 22 are arranged in sequence starting from the bottom in the sealed space 8 within the fuel cell module 2 housing 6, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

An air heat exchanger 22 is provided over the reformer 20. The air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top inside of the exhaust gas conduit 80 communicates with the space in which the air heat exchanger to rule 22 is disposed, and the bottom end side communicates with the exhaust gas chamber 78. An exhaust gas discharge pipe 82 is connected at approximately the center of the bottom surface of the exhaust gas chamber 78; the downstream end of the exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18. No heating means such as a burner or the like for separately heating the combustion chamber 18 or the fuel cell unit 16 to support ignition at startup or prevent flameout or blow out is provided on the combustion chamber 18.

Figure 4:
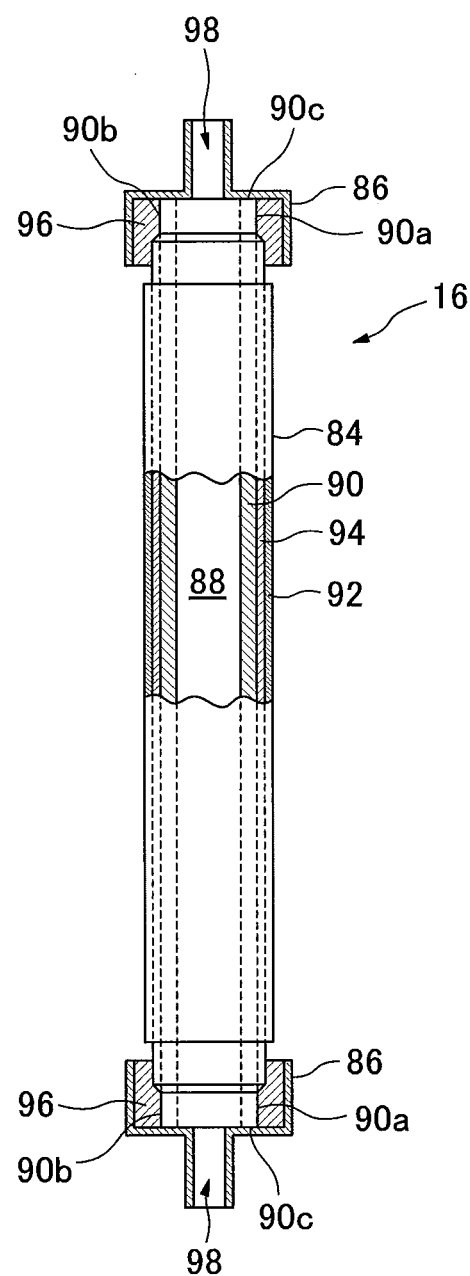
FIG. 4: A partial sectional diagram showing a solid oxide fuel cell device (SOFC) fuel cell unit according to an embodiment of the present invention.

Next, referring to FIG. 4, the fuel cell unit 16 will be explained. As shown in FIG. 4, the fuel cell unit 16 is furnished with a tubular structure 84 and internal electrode terminals 86, respectively connected to the respective terminals at the top and bottom of the tubular structure 84.

The fuel cell units 16 each comprise the tubular structure 84 extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and is a (−) pole, while the external electrode layer 92 is an air electrode for contacting the air, and is a (+) pole.

The internal electrode terminals 86 attached at the top and bottom ends of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from among Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; Ag, or the like.

Figure 5:
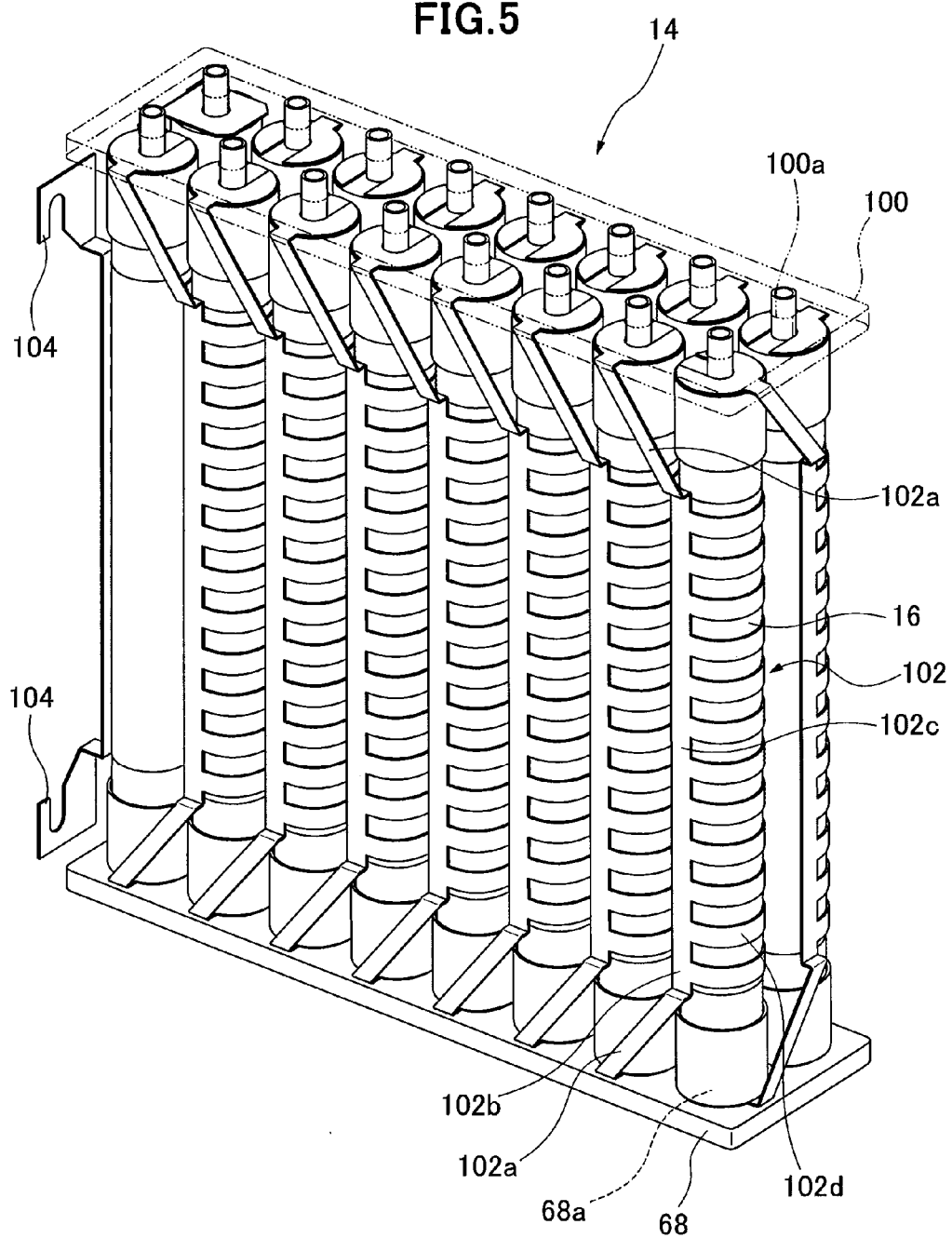
FIG. 5: A perspective diagram showing a solid oxide fuel cell device (SOFC) fuel cell stack according to an embodiment of the present invention.

Next, referring to FIG. 5, the fuel cell stack 14 will be explained. s shown in FIG. 5, the fuel cell stack 14 is furnished with sixteen fuel cell units 16; the top sides and bottom sides of these fuel cell units 16 are respectively supported by a lower support plate 68 and upper support plate 100. Through holes 68a and 100a, through which the inside electrode terminal 86 can penetrate, are provided on the lower support plate 68 and upper support plate 100.

In addition, a current collector 102 and an external terminal 104 are attached to the fuel cell unit 16. The current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from the vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, inside electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Next, referring to FIG. 6, the sensors attached to the solid oxide fuel cell (SOFC) device according to the embodiment of the present invention will be explained.

Figure 6:
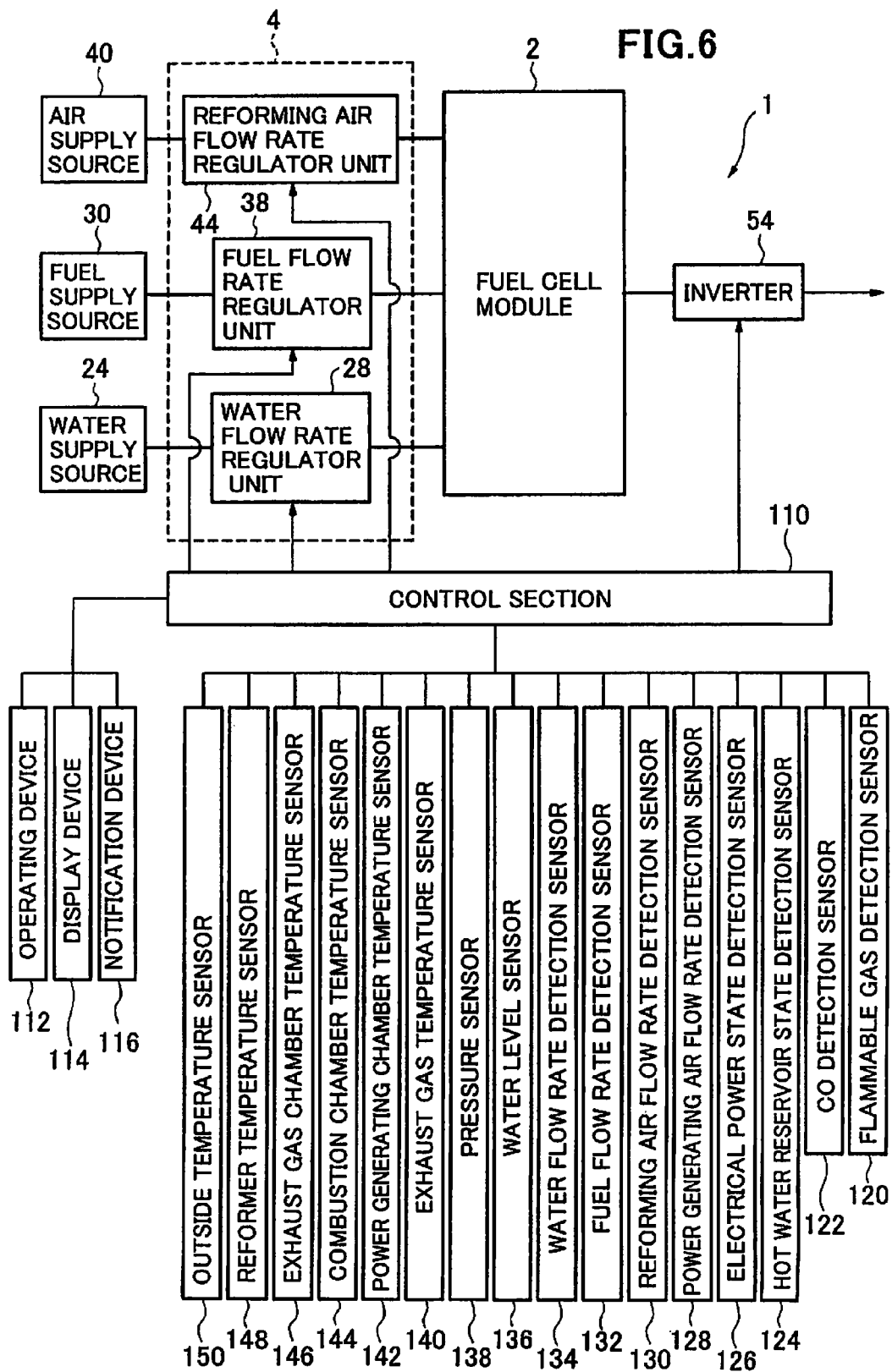
FIG. 6: A block diagram showing a solid oxide fuel cell device (SOFC) according to an embodiment of the present invention.

As shown in FIG. 6, a solid oxide fuel cell device 1 is furnished with a control unit 110, an operating device 112 provided with operating buttons such as "ON" or "OFF" for user operation, a display device 114 for displaying various data such as a generator output value (Watts), and a notification device 116 for issuing warnings during abnormal states and the like are connected to the control unit 110. The notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the flammable gas detection sensor 120 is to detect leakage of CO in the exhaust gas, which is meant to be exhausted to the outside via the exhaust gas conduit 80 and the like, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A power generating air flow rate detection sensor 128 detects the flow rate of power generating air supplied to the generating chamber 10.

A reforming air flow rate sensor 130 detects the flow rate of reforming air supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell units 16).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell (SOFC) device is placed outdoors, the outside temperature sensor 150 detects the temperature of the outside atmosphere. Sensors to detect outside atmospheric humidity and the like may also be provided.

As shown in FIG. 3, ignition sensors 152 are provided in several locations near the top end portion of the fuel cell assembly 12, and function to detect the temperature around the top end portion of the fuel cell assembly 12 when the ignition device 83 is ignited, and to determine the ignition state based on the temperature.

Signals from these various sensors are sent to the control unit 110; the control unit 110 sends control signals to the water flow rate regulator unit 28, the fuel flow rate regulator unit 38, the reforming air flow rate regulator unit 44, and the power generating air flow rate regulator unit 45 based on data from the sensors, and controls the flow rates in each of these units.

The control unit 110 sends control signals to the inverter 54 to control the supplied electrical power.

Next, referring to FIG. 7, the operation of a solid oxide fuel cell (SOFC) device according to the present embodiment at the time of startup will be explained.

In order to warm up the fuel cell module 2, the operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 to the reformer 20 on the fuel cell module 2. At the same time, power generating air is supplied from the generating air flow rate regulator unit 45 to an air heat exchanger 22 of the fuel cell module 2, and the power generating air reaches the generating chamber 10 and the combustion chamber 18.

Immediately thereafter, fuel gas is also supplied from the fuel flow rate regulator unit 38, and fuel gas into which reforming air is blended passes through the reformer 20, the fuel cell stack 14, and the fuel cell unit 16 to reach the combustion chamber 18.

Next, ignition is brought about by the ignition device 83, and fuel gas and air (reforming air and power generating air) supplied to the combustion chamber 18 is combusted. This combustion of fuel gas and air produces exhaust gas; the generating chamber 10 is warmed by the exhaust gas, and when the exhaust gas rises into the fuel cell module 2 sealed space 8, the fuel gas, which includes the reforming air in the reformer 20 is warm, as is the power generating air inside the air heat exchanger 22.

At this point, fuel gas into which the reforming air is blended is supplied to the reformer 20 by the fuel flow rate regulator unit 38 and the reforming air flow rate regulator unit 44, therefore the partial oxidation reforming reaction POX given by Expression (1) proceeds in the reformer 20. This partial oxidation reforming reaction POX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the temperature of the combustion chamber 18 has risen by the combustion of the fuel gas and air, and the fuel cell stack 14 is therefore heated from the upper side such that the temperature of the fuel cell stack 14 can be raised in an essentially uniform manner in the vertical direction. Even though the partial oxidation reforming reaction POX is progressing, the ongoing combustion reaction between fuel gas and air is continued in the combustion chamber 18.

$$C_mH_n + xO_2 \rightarrow aCO_2 + bCO + cH_2 \qquad (1)$$

When the reformer temperature sensor 148 detects that the reformer 20 has reached a predetermined temperature (e.g. 600° C.) after the start of the partial oxidation reforming reaction POX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction POX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction POX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, there will be no major drop in temperature. Also, the combustion reaction continues within the combustion chamber 18 even as the auto-thermal reforming reaction ATR proceeds.

When the reformer temperature sensor 146 detects that the reformer 20 has reached a predetermined temperature (e.g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

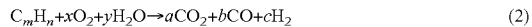
$$C_mH_n + xO_2 + yH_2O \rightarrow aCO_2 + bCO + cH_2 \qquad (2)$$

$$C_mH_n + xH_2O \rightarrow aCO_2 + bCO + cH_2 \qquad (3)$$

This steam reforming reaction SR is an endothermic reaction, therefore the reaction proceeds as a thermal balance is maintained with the heat of combustion from the combustion chamber 18. At this stage, the fuel cell module 2 is in the final stages of startup, therefore the temperature has risen to a sufficiently high level within the generating chamber 10 so that no major temperature drop is induced in the power generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction POX, the auto-thermal reforming reaction ATR, and the steam reforming reaction SR which proceed in that sequence. Next, when the temperature inside the generating chamber 10 and the temperature of the fuel cell units 16 reach a predetermined generating temperature which is lower than the rated temperature at which the cell module 2 can be stably operated, the circuit which includes the fuel cell module 2 is closed, power generation by the fuel cell module 2 begins, and current then flows to the circuit. Generation of electricity by the fuel cell module 2 causes the fuel cell units 16 to emit heat, such that the temperature of the fuel cell units 16 rises. As a result, the rated temperature at which the fuel cell module 2 is operated becomes, for example, 600° C.-800° C.

Following this, fuel gas and air having respective flow rates greater than those consumed by the fuel cell units 16 is applied in order to maintain the rated temperature and continue combustion inside the combustion chamber 18. Generation of electricity by the high reform-efficiency steam reforming reaction SR proceeds while electricity is being generated.

Next, referring to FIG. 8, the operation upon stopping the solid oxide fuel cell (SOFC) device according to the embodiment of the present invention will be explained.

Figure 8:
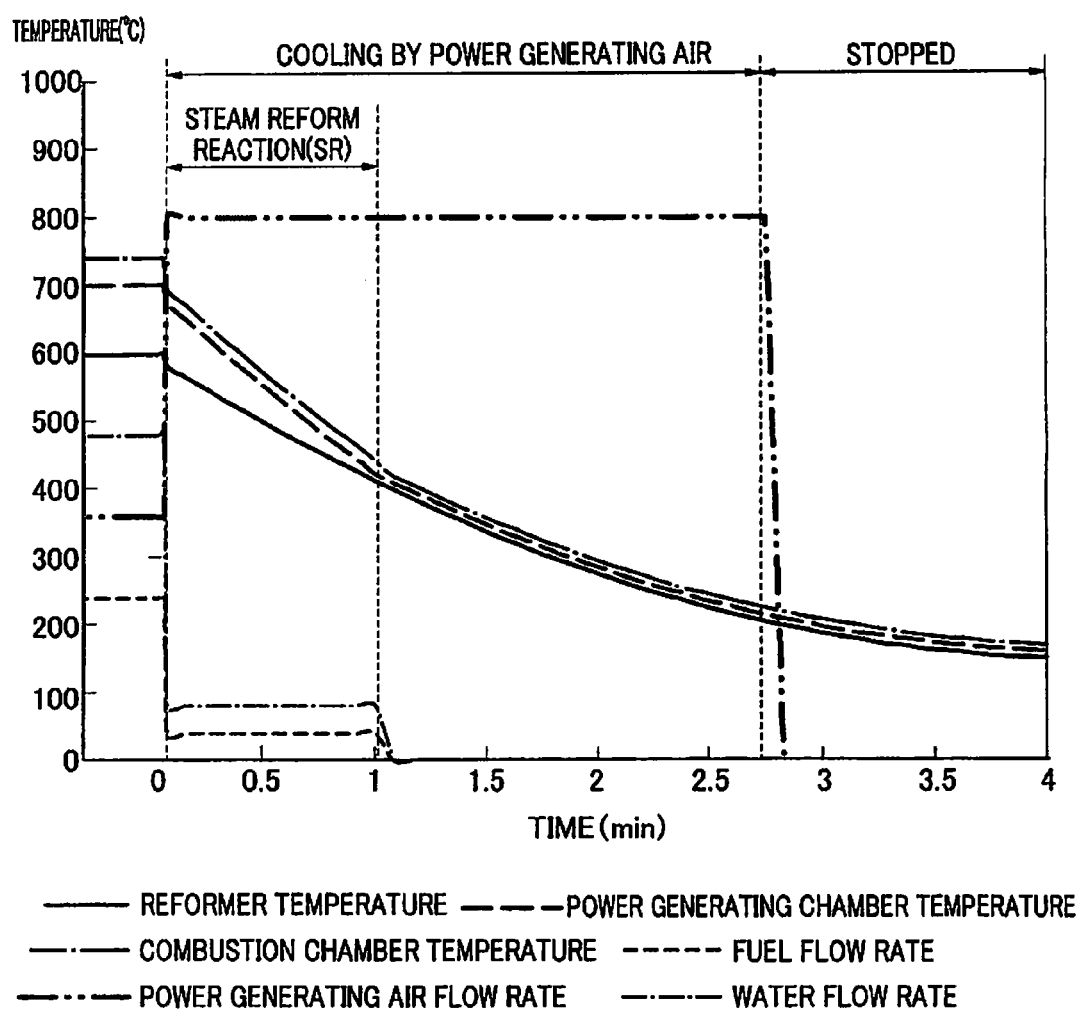
FIG. 8: A timing chart showing the operation at the time of shutdown of a solid oxide fuel cell device (SOFC) according to an embodiment of the present invention.

As shown in FIG. 8, when stopping the operation of the fuel cell module 2, the fuel flow rate regulator unit 38 and the water flow rate regulator unit 28 are first operated to reduce the flow rates of fuel gas and steam being supplied to the reformer 20.

When stopping the operation of the fuel cell module 2, the flow rate of power generating air supplied by the power generating air flow rate regulator unit 45 into the fuel cell module 2 is being increased at the same time that the flow rates of fuel gas and steam being supplied to the reformer 20 is being reduced; the fuel cell assembly 12 and the reformer 20 are air cooled to reduce their temperature. Thereafter, when the temperature of the generating chamber reaches a predetermined temperature, e.g. 400° C., supply of the fuel gas and steam to the reformer 20 is stopped, and the steam reforming reaction SR in the reformer 20 ends. Supply of the power generating air continues until the temperature in the reformer 20 reaches a predetermined temperature, e.g. 200° C.; when the predetermined temperature is reached, the supply of power generating air from the power generating air flow rate regulator unit 45 is stopped.

Thus in the embodiment of the present invention, the steam reforming reaction SR by the reformer 20 and cooling by power generating air are used in combination, therefore when the operation of the fuel cell module 2 is stopped, that operation can be stopped relatively quickly.

Next, referring to FIGS. 9 through 12, we discuss the effect of the load-following operation when generating electricity using a solid oxide fuel cell device 1 according to an embodiment of the present invention.

Figure 9:
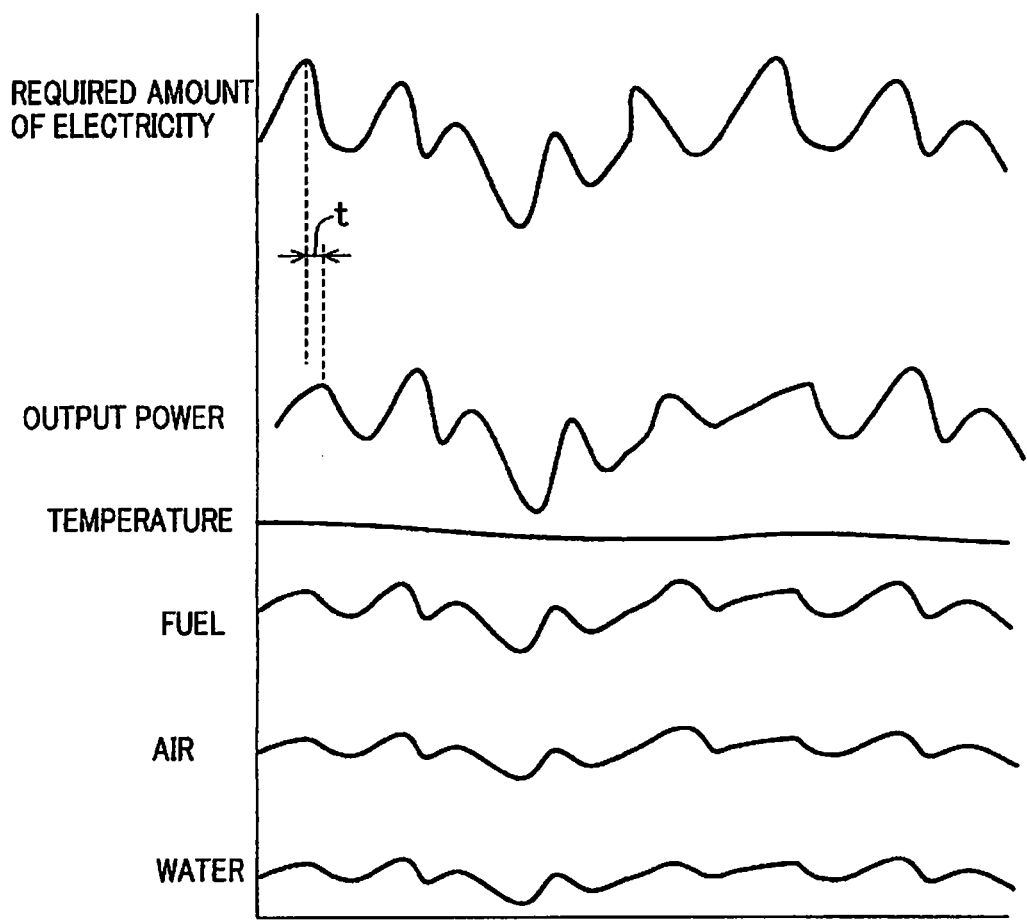
FIG. 9: A timing chart explaining the load-following operation in a solid oxide fuel cell device (SOFC) according to an embodiment of the present invention.
Figure 10:
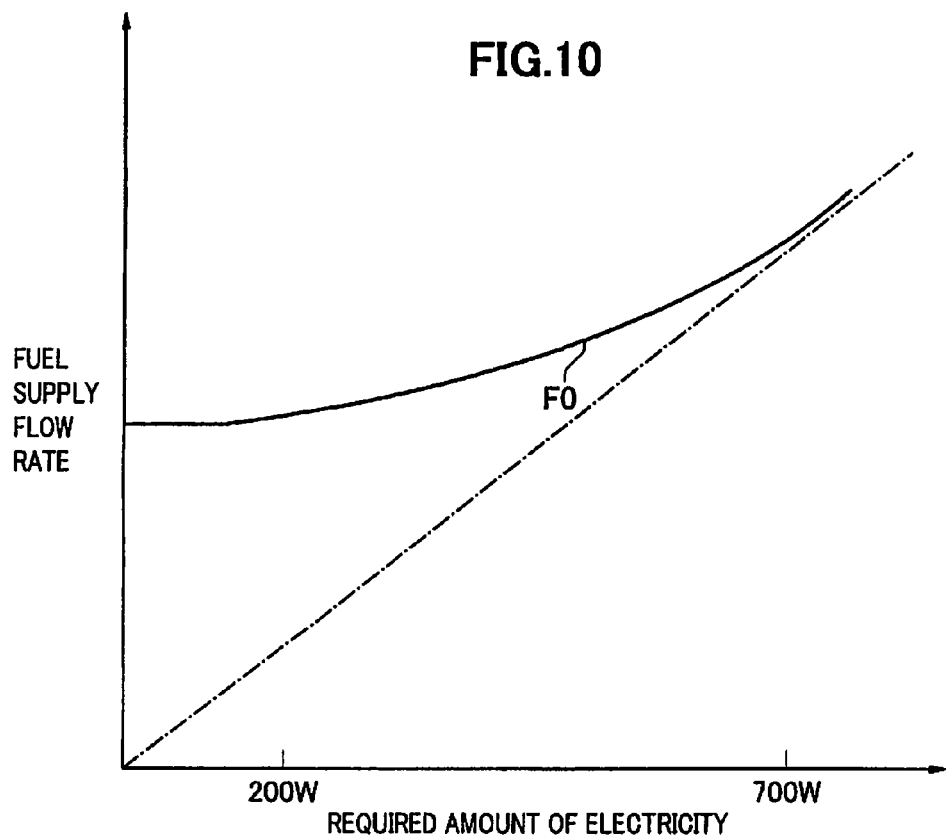
FIG. 10: A graph showing an example of the relationship between the required amount of generated electricity input to the control section and the fuel supply flow rate needed to produce the required amount of generated electricity in an embodiment of the present invention.
Figure 11:
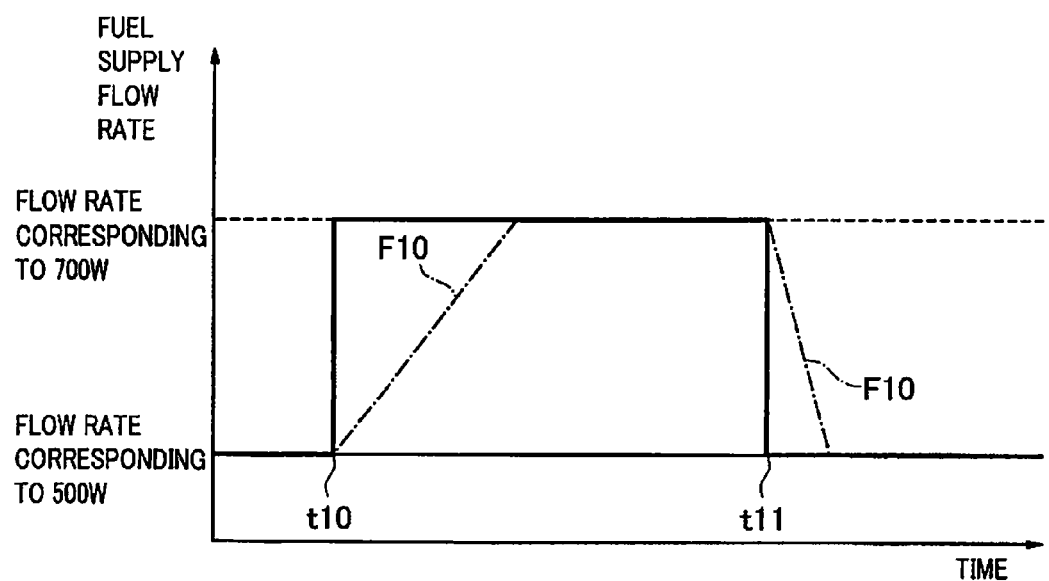
FIG. 11: A graph showing an example of the change over time in fuel supply flow rate relative to changes in the required amount of generated electricity in an embodiment of the present invention.

FIG. 9 is a timing chart explaining the load-following operation in a solid oxide fuel cell device of the embodiment. FIG. 10 is a graph showing an example of the relationship between the required amount of generated electricity input to the control section and the fuel supply flow rate needed to produce the required amount of generated electricity. FIG. 11 is a graph showing an example of the change over time in fuel supply flow rate relative to changes in the required amount of generated electricity. FIG. 12 is a data table showing an example of the relationship between the required amount of generated electricity and the fuel supply flow rate, generating air supply flow rate, and water supply flow rate needed to produce the required amount of generated electricity.

Figure 7:
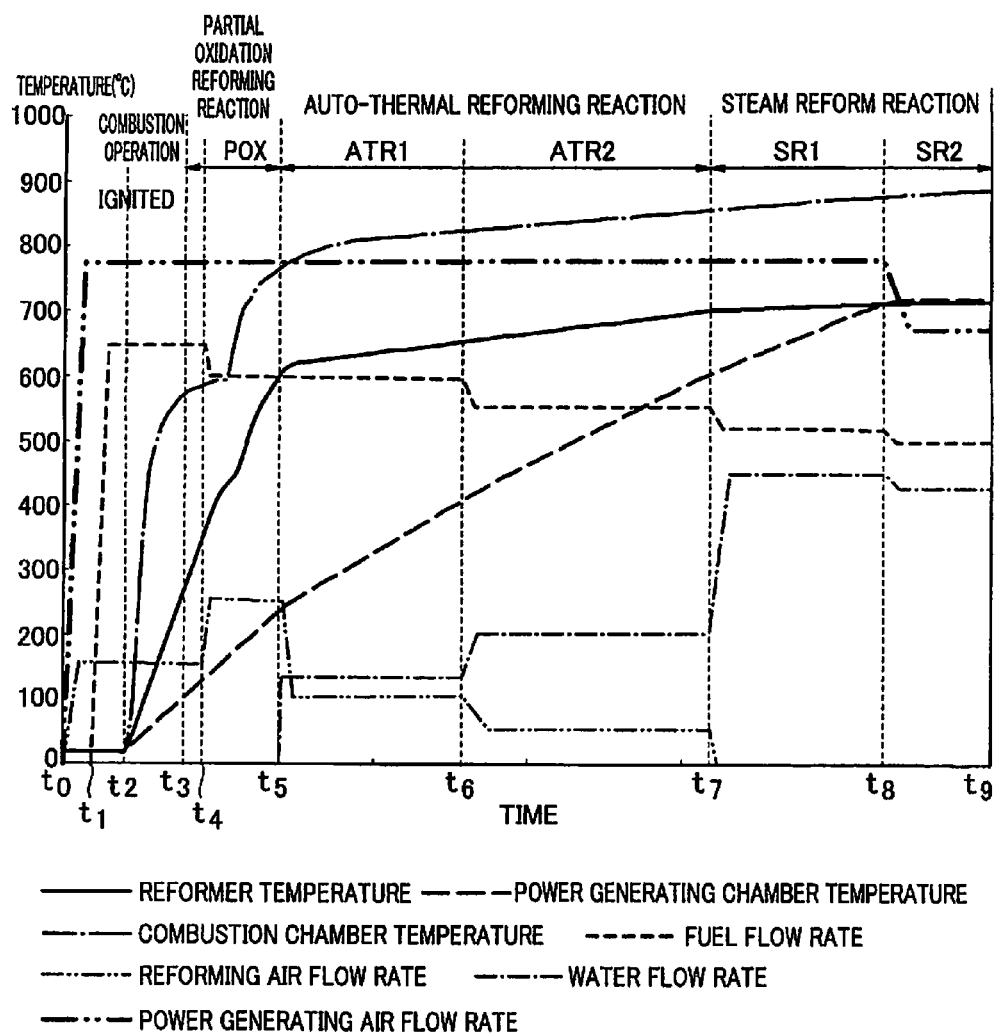
FIG. 7: A timing chart showing the operation upon startup of a solid oxide fuel cell device (SOFC) according to an embodiment of the present invention.

After the startup processing described in FIG. 7, the solid oxide fuel cell device 1 executes the load-following operation shown in FIG. 9 to obtain an output power corresponding to the required amount of generated electricity from the inverter 54 (FIG. 6). In other words, as shown in FIG. 6, the control section 110 serving as controller sends signals to the fuel flow regulator unit 38 serving as fuel supply device, the generating airflow regulator unit 45 serving as oxidant gas supply device, and the water flow regulator unit 28 serving as water supply device in response to the required amount of generated electricity from the inverter 54, thereby supplying the requisite flow quantities of fuel, air, and water to the fuel cell module 2. As shown in FIG. 9, the output power of the solid oxide fuel cell device 1 thereby changes to follow the amount of generated electricity required from the inverter 54. Here, the output power response relative to the required amount of generated electricity is delayed by a time t; the delay in output power changes due to the slowing of the change in fuel supply flow rate, etc., and output power-following is also delayed relative to the sudden change in required electrical generation, due to the major suppression of change in fuel supply flow rate. Note that the control section 110, the fuel flow regulator unit 38, the generating airflow regulator unit 45, and the water flow regulator unit 28 function respectively as a control means, a fuel supply means, an oxidant gas supply means, and a water supply means.

The control section 110 determines the fuel supply flow rate in accordance with the required amount of generated electricity from the inverter 54 using the graph illustrating an example in FIG. 10, and controls the fuel flow regulator unit 38 so that the determined flow quantity of fuel is supplied to the reformer 20 in the fuel cell module 2. The control section 110 determines a fuel supply flow rate relative to the required electrical generation according to curve F0 in FIG. 10. As shown in FIG. 10, the fuel supply flow rate is determined so as to increase monotonically with an increase in the required amount of generated electricity, however the fuel supply flow rate is essentially a fixed value at or below the required generated electricity amount of approximately 200 W.

When the required amount of generated electricity is changed, degradation of the fuel cell module 2 may be hastened due to the sudden change in fuel cell unit temperature if the fuel supply flow rate is suddenly changed, therefore as shown in FIG. 11, the fuel supply flow rate is gradually increased or gradually decreased in order to achieve slow changes. As shown in FIG. 11, the rate of change in the fuel supply flow rate when fuel is increased is set to be smaller than the rate of change in the fuel supply flow rate when fuel is reduced. In other words, if the change is slowed and the delay is made large relative to a reduction in the fuel supply flow rate, fuel is unnecessarily consumed, therefore the rate of change is set to be larger for a reduction than for an increase. FIG. 11 is a graph showing an example of the change in fuel supply flow rate over time when the required amount of generated electricity changes in a step fashion from 500 W to 700 W. As shown in FIG. 11, if the required amount of generated electricity is suddenly changed from 500 W to 700 W at time t10, the required fuel supply flow rate also changes, from a supply flow rate corresponding to a 500 W electrical power output to a supply flow rate corresponding to 700 W. However, the control section 110 controls the fuel flow regulator unit 38 to gradually increase the fuel supply flow rate as shown by the imaginary line F10 in FIG. 11, so as to prevent a sudden increase in the fuel supply flow rate.

Similarly, at time t11, when the required amount of generated electricity changes from 700 W to 500 W, the control section 110 gradually reduces the fuel supply flow rate following imaginary line F10 in FIG. 11 so as to avoid sudden reduction in the fuel supply flow rate. Note that the rate of change in the fuel supply flow rate is set to be more gradual for an increase in the supply flow rate than a reduction in the supply flow rate. As explained above, the fuel reduction side does not act in the direction of increasing the cell temperature, therefore optimization is performed to reduce wasteful fuel consumption while preventing excess temperature reduction caused by the reduction in fuel, taking note of the low sensitivity to cell degradation.

FIGS. 10 and 11 relate to fuel supply flow rate, but the generating air supply flow rate and water supply flow rate are similarly changed in response to the required amount of generated electricity. Also, as shown by the example in FIG. 12, the proportions of fuel, generating air, and water supply quantities relative to the required amounts of generating electricity are optimized to obtain an appropriate operating state, and differ depending on the amount of generate electricity required. The solid oxide fuel cell device 1 in the present embodiment is constituted to output electrical power in an output power range of 200 W to 700 W. In this output power range, the proportions of fuel, generating air, and water supply quantities during electrical generation are set so that if the fuel supply flow rate is 1, the generating air supply flow rate is approximately 14.7-17.1, and the water supply flow rate is approximately 0.0021-0.0025.

Next, referring to FIGS. 13 and 14 and again to FIG. 7, we discuss details of startup processing for the solid oxide fuel cell device 1 of this embodiment of the present invention.

Figure 14:
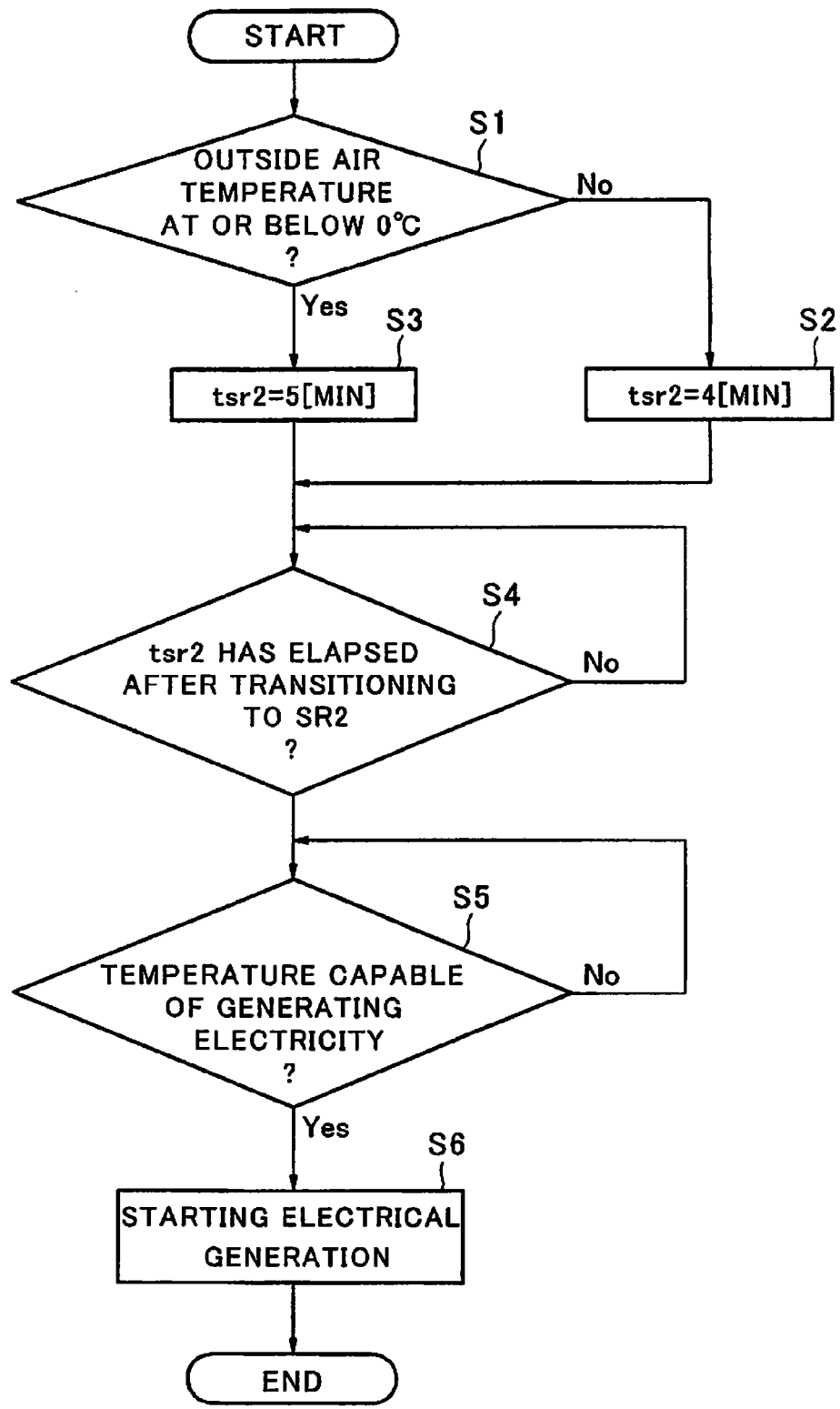
FIG. 14: A flowchart showing processing by the control section immediately prior to startup of electrical generation.

FIG. 13 is an operation table showing the solid oxide fuel cell device 1 startup processing procedure. FIG. 14 is a flow chart showing processing by the control section 110 immediately prior to the startup of electrical generation.

When the solid oxide fuel cell device 1 is started up at time t0 in FIG. 7, the control section 110 sends a signal to the reforming airflow regulator unit 44 serving as reforming oxidant gas supply device and to the generating airflow regulator unit 45 serving as electrical generating oxidant gas supply device, thereby starting those devices and supplying reforming air and generating air to the fuel cell module 2. In the present embodiment, the reforming air supply flow rate is set at 10 L/min and the generating air supply flow rate at 100 L/min when supply is started at time t0 (FIG. 13).

Next, at time t1, the control section 110 sends a signal to the fuel flow regulator unit 38 serving as fuel supply device, thereby starting the supply of fuel to the reformer 20. Fuel and reforming air thereby fed into the reformer 20 are thus fed into each of the fuel cell units 16 via the reformer 20, the fuel gas supply pipe 64, and the manifold 66. Fuel and reforming air fed into each of the fuel cell units 16 flows out of the top ends of each of the fuel cell unit 16 fuel gas flow paths 98. Note that in the present embodiment, the fuel supply flow rate is set at 6 L/min when supply is started at time t1 (the "combustion operation" state in FIG. 13).

Moreover, at time t2, the control section 110 sends a signal to the ignition device 83 and ignites fuel flowing out of the fuel cell unit 16. Fuel is thus combusted in the combustion chamber 18, so that the reformer 20 disposed there above is heated, and the temperature of the combustion chamber 18, the electrical generating chamber 10 and the fuel cell stack 14 disposed there within the chamber 10 also rises (times t2-t3 in FIG. 7). When the temperature of the reformer 20 reaches about 300° C. as a result of this heating of the reformer, a partial oxidation reform reaction (POX) occurs within the reformer 20 (time t3 in FIG. 7). Because the partial oxidation reform reaction is an exothermic reaction, the reformer 20 is heated by the heat of reaction arising from the occurrence of the partial oxidation reform reaction.

When the temperature further rises and the temperature of the reformer 20 reaches 350° C., the control section 110 sends a signal to the fuel flow regulator unit 38 reducing the fuel supply flow rate, and sends a signal to the reforming airflow regulator unit 44 increasing the reforming air supply flow rate (time t4 in FIG. 7). As a result, the fuel supply flow rate is changed to 5 L/min, and the reforming air supply flow rate is changed to 18 L/min (the "POX1" state in FIG. 13). These supply quantities are appropriate supply quantities for generating a partial oxidation reaction. In other words, in the initial temperature region in which a partial oxidation reaction begins to occur, a state is formed in which fuel is reliably ignited by increasing the proportion of fuel supplied, and ignition is stabilized by maintaining that supply flow rate (the "POX1" state in FIG. 13). Moreover, after stable ignition and a rise in temperature, fuel waste is suppressed by using a fuel supply flow rate sufficient to produce a partial oxidation reaction (the "POX2" state in FIG. 13).

Next, at time t5 in FIG. 7, when the reformer 20 temperature reaches 600° C. or above and the fuel cell unit 16 temperature reaches 250° C. or above, the control section 110 sends a signal to the reforming airflow regulator unit 44 to reduce the reforming air supply flow rate, and sends a signal to the water flow regulator unit 28 serving as water supply device to start the supply of water. This results in a change in the reforming air supply flow rate to 8 L/min, and in the water supply flow rate to 2 cc/min (the "ATR1" state in FIG. 13). A steam reforming reaction is also generated in the reformer 20 by introducing water (steam) into the reformer 20. In other words, in the FIG. 13 "ATR1" state, an auto-thermal reforming (ATR) occurs in which the partial oxidation reaction and the steam reforming reaction are combined.

In the present embodiment, the temperature of the fuel cell unit 16 is measured by a generating chamber temperature sensor 142 serving as a temperature detection means disposed in the electrical generating chamber 10. The temperature inside the generating chamber and the temperature of the fuel cell units are not, precisely speaking, identical, but the temperature detected by the generating chamber temperature sensor reflects the temperature of the fuel cell unit, and the temperature of the fuel cell unit can be grasped by the temperature of the generating chamber temperature sensor inside the generating chamber. Note that in this Specification, "fuel cell unit temperature" means a temperature measured by any selected sensor indicating a value reflecting the temperature of the fuel cell unit.

Moreover, at time t6 in FIG. 7, when the temperature of the reformer 20 reaches 600° C. or above and the temperature of the fuel cell unit 16 reaches 400° C. or above, the control section 110 sends a signal to the fuel flow regulator unit 38 and reduces the fuel supply flow rate. The control section 110 also sends a signal to the reforming airflow regulator unit 44 reducing the reforming air supply flow rate, and sends a signal to the water flow regulator unit 28 increasing the water supply flow rate. By this means, the fuel supply flow rate is changed to 4 L/min, the reforming air supply flow rate is changed to 4 L/min, and the water supply flow rate is changed to 3 cc/min (the "ATR2" state in FIG. 13). Reducing the reforming air supply flow rate and increasing the water supply flow rate results in a reduction in the proportion of the partial oxidation reaction and an increase in the proportion of the steam reforming reaction in the reformer 20.

Next, at time t7 in FIG. 7, when the temperature of the reformer 20 reaches 650° C. or above and the temperature of the fuel cell unit 16 reaches 600° C. or above, the control section 110 sends a signal to the reforming airflow regulator unit 44, stopping the supply of reforming air. The control section 110 also sends a signal to the fuel flow regulator unit 38 reducing the fuel supply flow rate, and sends a signal to the water flow regulator unit 28, increasing the water supply flow rate. The flow rate of fuel supplied is thus changed to 3 L/min, and the flow rate of water supplied is changed to 8 cc/min (the "SR1" state in FIG. 13). Because the supply of reforming air is stopped, the partial oxidation reaction ceases to occur inside the reformer 20, and the SR, in which only the steam reforming reaction takes place, commences.

Moreover, at time t8 in FIG. 7, when the temperature of the reformer 20 reaches 650° C. or above and the temperature of the fuel cell unit 16 reaches 700° or above, at which electrical generation is possible, the control section 110 sends a signal to the fuel flow regulator unit 38, reducing the flow rate of fuel supplied and sends a signal to the water flow regulator unit 28, reducing the flow rate of water supplied. The control section 110 also sends a signal to the generating airflow regulator unit 45, reducing the flow rate of generating air supplied. The fuel supply flow rate is thus changed to the electrical generation standby fuel supply flow rate, which is 2.3 L/min; the water supply flow rate is changed to 6.3 cc/min, and the generating air supply flow rate is changed to 80 L/min (the "SR2" state in FIG. 13).

In addition, when a transition to the "SR2" state shown in FIG. 13 occurs, the control section 110 executes the flowchart shown in FIG. 14.

First, in step S1 of FIG. 14, the control section 110 judges whether the temperature detected by the outside air temperature sensor 150 is at or below 0° C. If it is not at or below 0° C., it proceeds to step S2; if it is at or below 0° C., it proceeds to step S3. In step S2, the transition time to electrical generation tsr2, which is the time during which the "SR2" state is maintained, is set at 4 minutes. When the outside air temperature is at or below 0° C., the transition time to electrical generation tsr2 is set to 5 minutes in step S3.

Next, in step S4, a judgment is made as to whether the transition time electrical generation T has elapsed after transitioning to the "SR2" state. If transition time electrical generation tsr2 has elapsed, the control section 110 proceeds to step S5; if it has not elapsed, the step S4 processing is repeated. In addition, a judgment is made in step S5 as to whether the temperature of the fuel cell unit 16 is at or above the 700° C. at which electrical generation is possible. If the temperature of the fuel cell unit 16 is at or above the temperature at which electrical generation is possible, the control section 110 proceeds to step S6 and electrical generation is started (time t9 in FIG. 7). If the temperature of the fuel cell unit 16 has not reached the temperature at which electrical generation is possible, the step S5 process is repeated, and the "SR2" state is maintained until the temperature of the fuel cell unit 16 is at or above the temperature at which electrical generation is possible.

After startup of electrical generation, the fuel supply flow rate, generating air supply flow rate, and water supply flow rate are determined and supplied based on FIGS. 10 and 11 in response to the required electrical power, and a load-following operation is executed.

Note that in the present embodiment, the transition time electrical generation tsr2 is set based on outside air temperature, but the transition time electrical generation tsr2 may also be changed in response to an environmental factor such as outside air temperature, water temperature, or time of day. In the example shown in FIG. 7, the fuel cell unit 16 temperature quickly rises to a temperature capable of generating electricity after transitioning to the "SR1" state, but if a predetermined initial SR continuation time tsr1 elapses following transition to the "SR1" state, the control section 110 causes operation to transition to the "SR2" state even if an electrical generating temperature has not been reached to the temperature at which electricity can be generated. In other words, the control section 110 maintains the "SR1" state fuel supply flow rate until the temperature of the fuel cell units 16 has risen to one capable of generating electricity, or until an initial SR continuation time tsr1 has elapsed. In this embodiment, the initial SR continuation time tsr1 is set at 30 minutes. Moreover, the control section 110 starts the generation of electricity when a predetermined transition time electrical generation tsr2 has elapsed and the temperature of the fuel cell unit 16 has risen to or above a temperature capable of generating electricity, after transition to the "SR2" state. The "SR2" state is therefore always continued longer than the transition time electrical generation tsr2.

As described above, the flow rate of fuel supplied at a time immediately prior to the start of electrical generation (time t9) is reduced by approximately 23.3% relative to the fuel supply flow rate when the SR, in which only the steam reforming reaction occurs within the reformer 20, is started (time t7); the water supply flow rate is reduced approximately 21.3%, and the generating air supply flow rate is reduced approximately 20%. The proportion of the fuel supply reduction is therefore greater than the proportion off the water supply reduction, and is set so as to be the most reduced of all of the supply quantities. In other words, carbon deposition can be reliably prevented by increasing the amount of water versus fuel.

The fuel supply flow rate immediately prior to the start of electrical generation (time t9) is fixed at a value which is higher than the fuel supply flow rate of 1.7 L/min corresponding to the lowest output power of 200 W in the output power range, and higher than the fuel supply flow rate of 2.2 L/min corresponding to the intermediate value of 450 W in the output power range (FIG. 12). Alternatively, the fuel supply flow rate immediately prior to startup of electrical generation (time t9) can be set at a value approximately the same as the fuel supply flow rate corresponding to 700 W, which is the maximum value of the output power range.

Furthermore, the electrical generation standby supply proportions which are proportions of the fuel supply flow rate, generating air supply flow rate, and water supply flow rate immediately prior to the start of electrical generation (time t9) are set at approximately 1:34.8:0.0027, which differs significantly from the supply flow rate proportions for generating electricity shown in FIG. 12. Thus electrical generation standby supply proportions are set in state "SR2" in FIG. 12 to optimize for achievement of a smooth transition from the "SR1" state, in which the temperature of the fuel cell unit 16 is raised, to the electrical generating state, while inducing a steam reforming reaction. In these electrical generation standby supply proportions, the generating air supply flow rate is significantly increased relative to the supply proportions (FIG. 12) during electrical generation state. In other words, with the electrical generation standby supply proportions in the present embodiment, the generating air supply flow rate is maximally reduced when electrical generation starts. By this means, excess generating air can be supplied and fuel combusted, and the fuel cell unit 16 sufficiently heated during startup processing prior to beginning the generation of electricity, while during the generation of electricity, when fuel is reduced compared to startup processing, generating air is reduced so that cooling of the fuel cell unit 16 by the generating air can be prevented.

In the solid oxide fuel cell device of the present embodiment of the invention, generation of electricity is started after a fixed fuel supply flow rate has been maintained for a predetermined transition time electrical generation or more, therefore combustion of fuel at the startup of electrical generation and reformer heat balancing can be stabilized. Thereby, the startup state can be smoothly transited to the electrical generating state. Moreover, the operating state at the time of electrical generation startup can be stabilized because the fuel supply flow rate is fixed immediately prior to starting electrical generation. The fuel supply flow rate in the SR immediately prior to startup of electrical generation (the "SR2" state) is reduced in a stepped fashion relative to the fuel supply flow rate at the start of the SR (the "SR1" state), therefore sudden drops in the temperature of the solid oxide fuel cell unit can be prevented even when the fuel supply flow rate is reduced at the startup of electrical generation.

In the solid oxide fuel cell device of the present embodiment, electrical generation is started when the transition time electrical generation has elapsed and the fuel cell unit reaches a temperature at which electrical generation is possible, therefore startup of electrical generation in a state in which the fuel cell unit has not reached a sufficient temperature can be prevented and, because a fixed fuel supply flow rate is maintained until the transition time electrical generation does elapse, fuel can be stably combusted in the combustion chamber even after the temperature has risen sufficiently.

In addition, in the solid oxide fuel cell device of the present embodiment, when the solid oxide fuel cell unit reaches a temperature at which electrical generation is possible following startup of the SR, the fuel supply flow rate is reduced, but a transition to the "SR2" state can occur even if the electrical generation temperature has not been reached to the temperature at which electrical generation is possible if the predetermined initial SR continuation time has elapsed. In such cases, the reduced fuel supply flow rate is maintained until at least the fuel cell unit temperature reaches the temperature at which electrical generation is possible. Thus if the initial SR continuation time has elapsed even though the temperature has not been reached to the temperature at which electrical generation is possible, the "SR2," in which the fuel supply flow rate is reduced, will be started, and the control section will wait until the transition time electrical generation has elapsed in the "SR2" state, and until the temperature has risen to the point at which electrical generation is possible, therefore the time needed from turning on until the start of electrical generation can be shortened.

In the solid oxide fuel cell device of the present embodiment, a sufficiently stable operating state can be obtained at the start of electrical generation by changing the transition time electrical generation in response to predetermined environmental factors, even if the environment in which the fuel cell device is placed changes. In particular, by extending the transition time electrical generation when the outside air temperature is low, combustion of fuel in the combustion chamber in the "SR2" state can be sufficiently stabilized, even if the outside air temperature is low and the solid oxide fuel cell unit temperature is not sufficiently raised.

Moreover, in the solid oxide fuel cell device of the present embodiment, the water supply flow rate in the "SR2" state immediately prior to startup of electrical generation is reduced relative to the water supply flow rate in the "SR1" state, therefore a decline in the temperature of the fuel cell module can be prevented. In other words, fuel is also used to generate electricity when transitioning from startup to the electrical generation state, and is therefore combusted in the combustion section, reducing the amount of fuel that had been contributing to heat. At this point, maintaining the water supply flow rate in the "SR1" state leads to a temperature decline. Therefore a decline in fuel cell module temperature can be prevented by reducing the water supply flow rate in the "SR2" state more than the water supply flow rate in the "SR1" state.

In the solid oxide fuel cell device of the present embodiment, the generating air supply flow rate in the "SR2" state immediately prior to startup of electrical generation is reduced more than in the "SR1" state at SR startup, therefore fuel can be stably combusted by reducing a flow rate of the generating air to an appropriate flow rate which had been additionally supplied during the SR startup to raise the temperature of the solid oxide fuel cell units.

In the solid oxide fuel cell device of the present embodiment, the fuel supply flow rate in the "SR2" state immediately prior to startup of electrical generation is less than the fuel supply flow rate in the "SR1" state at the startup of the SR, and more than the fuel supply flow rate corresponding to the minimum output electrical power, therefore fuel waste prior to startup of electrical generation can be suppressed, and the temperature of the solid oxide fuel cell units can be prevented from dropping too much when the required electrical power at startup of electrical generation is the minimum output electric power.

Also, in the solid oxide fuel cell device of the present embodiment, the fuel supply flow rate in the "SR2" state immediately prior to electrical generation is smaller than the fuel supply flow rate in the "SR1" state at the startup of the SR, and is fixed at a predetermined value greater than the fuel supply flow rate corresponding to an intermediate value in the output power range, therefore a transition to the electrical generation state can be quickly accomplished while suppressing fuel waste prior to startup of electrical generation, no matter what electric power within the output power range is required at the startup of electrical generation. Furthermore, the fuel supply flow rate is fixed immediately prior to startup of electrical generation, so the operating state at the startup of electrical generation can be stabilized.

Furthermore, in the solid oxide fuel cell device of the present embodiment the proportions of fuel supply flow rate, water supply flow rate, and generating air supply flow rate in the "SR2" state immediately prior to electrical generation differ from the proportions of fuel supply flow rate, water supply flow rate, and generating air supply flow rate when generating electricity, and are in predetermined electrical generation standby supply proportions optimized for standing by to start electrical generation, therefore a smooth transition to the electrical generation state can be accomplished.

In the solid oxide fuel cell device of the present embodiment, the electrical generation standby supply proportions are set such that the generating air supply flow rate is increased most relative to the proportions of supply flow rates when generating electricity, therefore by sufficiently supplying generating air to the combustion section in the "SR1" and "SR2" states prior to startup of electrical generation, combustion can be stabilized in the combustion section and heating can be effectively carried out, while after starting electrical generation, cooling of the solid oxide fuel cell units can be suppressed by using the generating air.

Moreover, in the solid oxide fuel cell device of the present embodiment, the electrical generation standby supply proportions are such that the fuel supply flow rate is reduced in the greatest proportion relative to the proportions of supply quantities in the "SR1" state at SR startup, therefore carbon deposition can be reliably prevented, since the water supply flow rate increases relative to the fuel supply flow rate in the "SR2" state immediately prior to startup of electrical generation.

In the solid oxide fuel cell device of the present embodiment, reforming reactions in the reformer proceed in the sequence POX, ATR, SR, therefore operation of the fuel cell module can be prevented from becoming unstable at the time of startup, and a smoother startup can be accomplished.

We have discussed above a preferred embodiment of the present invention, but, several variations on the above-described embodiment may also be added. In particular, in the embodiment discussed above, the solid oxide fuel cell device was constituted to be able to vary the output power according to the required amount of generated electricity, but the present invention could also be applied to a fuel cell device outputting a constant electrical power at all times. Also, in the embodiment discussed above, during the startup procedure, the reforming reactions within the reformer occurred in the sequence POX, ATR, and SR, but the ATR could, for example, be omitted. The present invention can be applied to a solid oxide fuel cell device for executing any desired startup processing to induce SR immediately prior to the start of electrical generation.

What is claimed is:

1. A solid oxide fuel cell system for generating electricity by reacting fuel and electrical generating oxidant gas, comprising:
   a fuel cell module comprising multiple solid oxide fuel cell units;
   a reformer configured to reform the fuel and supply the reformed fuel to the solid oxide fuel cell units;
   a fuel supply device configured to supply the fuel to the reformer for reformation of the fuel,
   a water supply device configured to supply water to the reformer;
   an oxidant gas supply device configured to supply oxidant gas to the solid oxide fuel cell units for generation of electricity;
   an electrical power extraction unit configured to extract electricity from the fuel cell module and to output the extracted electricity from the solid oxide fuel cell system; and
   a controller programmed to execute, before starting an electricity outputting operation, a startup procedure in which the solid oxide fuel cell units in the fuel cell module are raised to an operational temperature at which electricity is ready to be extracted from the fuel cell module prior to starting outputting of electricity from the solid oxide fuel cell system, the startup procedure carrying out, within the reformer, a steam reform reaction (SR) operation in which the controller operates the fuel supply device and the water supply device to effect only a steam reforming reaction;
   wherein the SR operation comprises a first SR operation and a second SR operation which is performed subsequent to the first SR operation, wherein the controller is programmed to initiate the first SR operation when the solid oxide fuel cell units are raised from a room temperature to a predetermined temperature which is lower than the operational temperature and advance the startup procedure from the first SR operation to the second SR operation, which is set to run for a predetermined transition time,
   wherein the controller is further programmed to keep the electrical power extraction unit from outputting electricity from the solid oxide fuel cell system during the first and second SR operations, and
   wherein the controller is further programmed to operate the fuel supply device to supply the fuel at a fuel supply rate larger than that effected during the electricity outputting operation, and to decrease the fuel supply rate at a transition from the first SR operation to the second SR operation and supply the fuel at a constant fuel supply rate during the second SR operation.

2. The solid oxide fuel cell system of claim 1, wherein upon expiration of the predetermined transition time, if the solid oxide fuel cell units have not reached the operational temperature, the controller is programmed to maintain the constant fuel supply rate to continue the second SR operation beyond the predetermined transition time until the solid oxide fuel cell units reach the operational temperature.

3. The solid oxide fuel cell system of claim 1, wherein the controller is programmed to maintain the first SR operation until the solid oxide fuel cell units reach the operational temperature at which the second SR operation is initiated.

4. The solid oxide fuel cell system of claim 2, wherein the controller is programmed to maintain the first SR operation for a predetermined time which defines a duration of the first SR operation.

5. The solid oxide fuel cell system of claim 1, wherein the predetermined transition time is varied according to operation conditions of the solid oxide fuel cell device.

6. The solid oxide fuel cell system of claim 5, wherein the predetermined transition time is set longer when an outside air temperature is lower.

* * * * *